No. 755,562. Patented March 22, 1904.

UNITED STATES PATENT OFFICE.

CHARLES HENRY BURCKETT AND MARY MARTIN BURCKETT, OF GLENRIDGE, NEW JERSEY; SAID CHARLES HENRY BURCKETT ASSIGNOR TO SAID MARY MARTIN BURCKETT.

COCOA CONFECTION AND PROCESS OF MAKING SAME.

SPECIFICATION forming part of Letters Patent No. 755,562, dated March 22, 1904.

Application filed September 3, 1902. Serial No. 121,982. (No specimens.)

*To all whom it may concern:*

Be it known that we, CHARLES HENRY BURCKETT and MARY MARTIN BURCKETT, citizens of the United States, and residents of Glenridge, in the county of Essex and State of New Jersey, have jointly invented a certain new and useful Improvement in Cocoa Confections and Processes of Making the Same, of which the following is a specification.

This invention relates to confections, and the product obtained herewith is similar to our invention filed September 2, 1902, Serial No. 121,871. Its object includes the product as well as the process of producing a cocoa confection comprising cocoa-beans, water, a starch-converting ferment, an emulsifying agent, a neutralizing agent, and sugar.

To make the confection, the successive steps to properly mix the ingredients are as follows: We take one and one-half pounds of cocoa-beans, preferably decorticated, or cocoa-beans that have been roasted may be used, and then grind the beans, after which they are subjected to pressure, thereby removing as much as possible of the butter of the beans. Next there is added one pound of water and the mixture heated to 212° Fahrenheit or over for about four hours, agitating during the heating, by which the starch-cells of the cocoa-beans will be broken. Next there is added a starch-converting ferment and the mixture digested at 170° Fahrenheit. The said ferment is added to saccharize the starch of the cocoa-beans, using, preferably, malt-diastase sufficient to saccharize one pound of starch, thereby producing malt-sugar, dextrine, &c., and a compound with a diastasic property. Should the diastasic property not be required in the finished product, a smaller quantity of the ferment is used. Next there is added and incorporated the butter which was previously removed, and when the latter becomes thoroughly melted there is added an emulsifying agent, preferably one pound of malt extract or an equivalent like gum-arabic. We then add a neutralizing agent, preferably one sixty-fourth of a pound of carbonate of soda, to neutralize the acids generated, then agitate and heat the mass until the butter is emulsified, add one and seven-eighths pounds of sugar, and continue to agitate and heat until the ingredients are thoroughly incorporated with one another.

The expression of the cocoa-butter before the breaking up of the starch-cells obviates the necessity of heating it in water and permits the retention of all the delicate flavor and aroma of the said butter.

The starch-converting ferment referred to in the specification is preferably made by grinding one pound of malt, neutralizing the acids of the hulls of same with a mixture of one one-hundred-and-fiftieth of a pound of lime dissolved in one-fourth of a pound of water. Then the malt is digested in one and three-fourths pounds of water for two hours at 170° Fahrenheit. The mixture is then generally filtered through a filter-press and the liquid obtained evaporated at not over 170° Fahrenheit until reduced to about one-fourth of a pound. This syrup will contain enough diastasic power to saccharize one pound of starch.

If malt extract is used as an emulsifying agent, as referred to in the specification, it is preferably made by grinding two pounds of malt, neutralizing the acids of the hulls by a mixture of one seventy-fifth of a pound of lime and one-half of a pound of water, then adding three and one-half pounds of water and digesting same at 170° Fahrenheit, and subjecting same to pressure to separate the liquid portion, which is evaporated quickly at a high temperature to one pound, and by reason of such evaporation does not contain any diastasic properties.

Having described our invention, we claim—

1. A confection consisting of butterless cocoa-beans, water, a starch-converting ferment, butter of cocoa-beans, an emulsifying agent, a neutralizing agent and sugar.

2. A confection consisting of butterless cocoa-beans, water, malt extract, butter of cocoa-beans, gum-arabic, carbonate of soda and sugar.

3. The herein-described process of removing the butter from cocoa-beans by pressure, heating with water and agitating to break the starch-cells of the cocoa-beans, adding a starch-converting ferment and digesting the mixture with heat to saccharize the starch of the cocoa-beans.

4. The herein-described process of removing the butter from cocoa-beans by pressure, heating with water and agitating to break the starch-cells of the cocoa-beans, adding a starch-converting ferment and digesting the mixture to saccharize the starch of the cocoa-beans, and adding the butter which was previously removed.

5. The herein-described process of removing the butter from cocoa-beans by pressure, heating with water and agitating to break the starch-cells of the cocoa-beans, adding a starch-converting ferment and digesting the mixture to saccharize the starch of the cocoa-beans, adding the butter which was previously removed, and adding an emulsifying agent.

6. The herein-described process of removing the butter from cocoa-beans by pressure, heating with water and agitating to break the starch-cells of the cocoa-beans, adding a starch-converting ferment and digesting the mixture to saccharize the starch of the cocoa-beans, adding the butter which was previously removed, adding an emulsifying agent, adding a neutralizing agent, heating and agitating until the butter is emulsified.

7. The herein-described process of removing the butter from cocoa-beans by pressure, heating with water and agitating to break the starch-cells of the cocoa-beans, adding a starch-converting ferment and digesting the mixture to saccharize the starch of the cocoa-bean, adding the butter which was previously removed, adding an emulsifying agent, adding a neutralizing agent, heating and agitating until the butter is emulsified, adding sugar, heating and agitating.

8. The herein-described process of removing the butter from cocoa-beans by pressure, heating with water and agitating to break the starch-cells of the cocoa-beans, adding malt-extract and digesting the mixture to saccharize the starch of the cocoa-beans, adding the butter which was previously removed, adding gum-arabic, adding carbonate of soda, heating and agitating, adding sugar, heating and agitating.

Signed at New York, in the county of New York and State of New York, this 29th day of August, A. D. 1902.

CHARLES HENRY BURCKETT.
MARY MARTIN BURCKETT.

Witnesses:
H. W. PACKARD,
A. J. SCHRODER.